(12) United States Patent
Shirai et al.

(10) Patent No.: US 6,380,885 B2
(45) Date of Patent: Apr. 30, 2002

(54) OBSTACLE RECOGNITION SYSTEM FOR VEHICLE

(75) Inventors: Noriaki Shirai, Kariya; Katsuhiro Morikawa, Nagoya, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/803,929

(22) Filed: Mar. 13, 2001

(30) Foreign Application Priority Data

Mar. 31, 2000 (JP) ........................................ 2000-098071

(51) Int. Cl.[7] .............................................. G01S 13/93
(52) U.S. Cl. ............................. 342/70; 342/27; 342/71; 342/118; 342/195
(58) Field of Search ............................... 342/21, 27, 28, 342/70, 71, 72, 104, 105, 107–118, 52, 53, 54, 195; 340/435, 436, 901, 902, 903, 27, 28

(56) References Cited

U.S. PATENT DOCUMENTS 5,574,463 A * 11/1996 Shirai et al. ................... 342/70
5,631,639 A * 5/1997 Hibino et al. ................ 340/903
5,754,099 A * 5/1998 Nishimura et al. .......... 340/435
5,798,727 A * 8/1998 Shirai et al. ................... 342/70

* cited by examiner

*Primary Examiner*—Bernarr E. Gregory
(74) *Attorney, Agent, or Firm*—Law Offices of David G. Posz

(57) ABSTRACT

Height-wise positions of objects are detected on the basis of distances to the objects from a vehicle, angles of the objects in a width-wise direction of the vehicle, and angles of the objects in a height-wise direction of the vehicle. A plurality of objects, which satisfy conditions predetermined depending on physical characteristics of delineators, are determined to be objects composing a delineator group. When the detected height-wise position of an object in the delineator group which is nearest to the vehicle corresponds to a predetermined value or less, the delineator group is determined to be a delineator group on a road surface. A determination is made as to whether each object in the on-road-surface delineator group is a non-delineator in response to conditions of the detected height-wise positions of the objects in the on-road-surface delineator group.

12 Claims, 7 Drawing Sheets

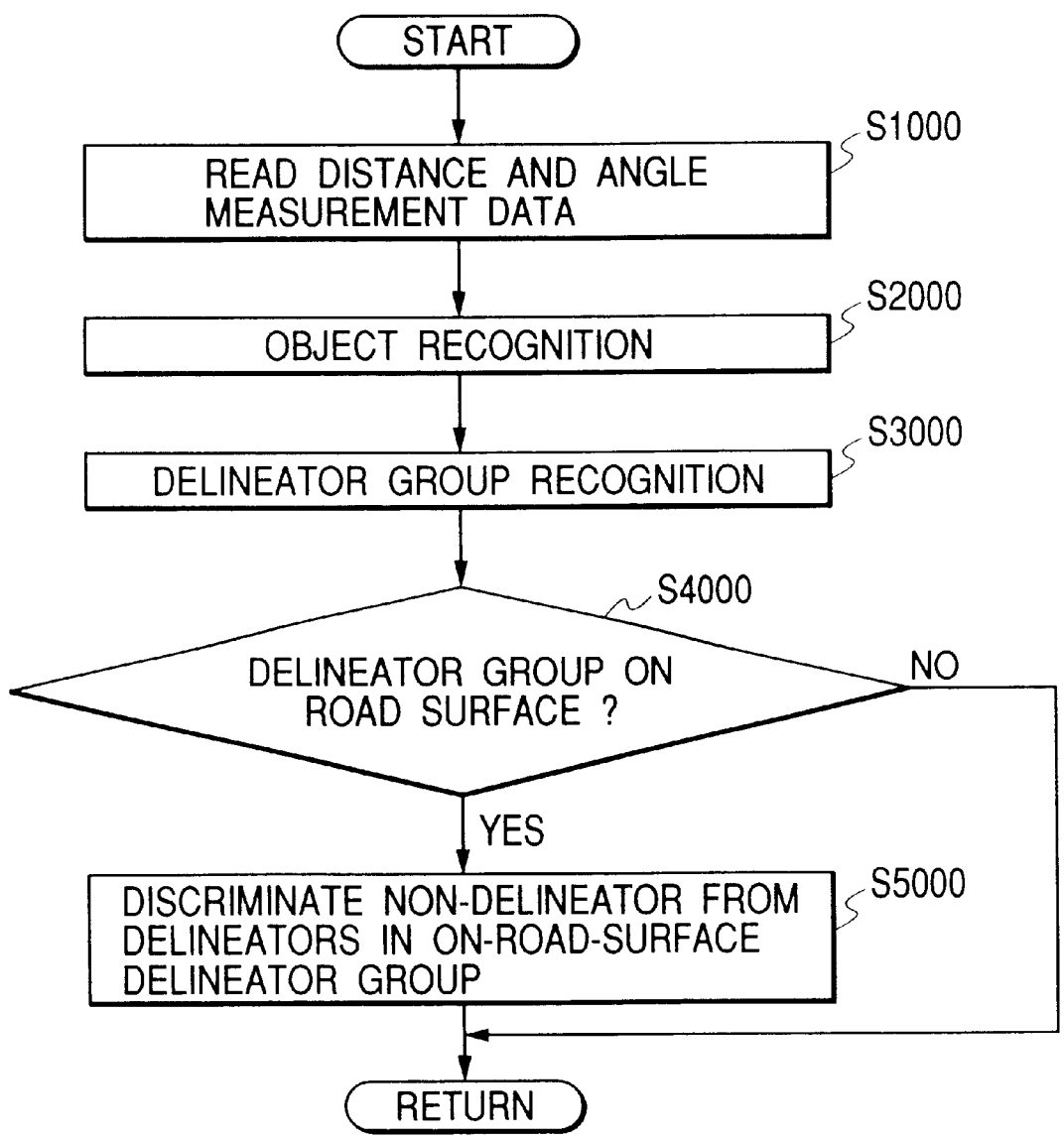

OBSTACLE RECOGNITION SYSTEM FOR VEHICLE

BACKGROUND OF THE INVENTION

1. Field of the Invention

This invention relates to a method of recognizing an obstacle to a vehicle. In addition, this invention relates to an apparatus for recognizing an obstacle to a vehicle. Furthermore, this invention relates to a recording medium which stores a computer program for recognizing an obstacle to a vehicle.

2. Description of the Related Art

A known obstacle recognition apparatus for a vehicle emits a forward wave beam such as a light beam or a millimeter wave beam into a given detection area in front of the body of the vehicle. In the case where an obstacle exists in the detection area, the forward wave beam encounters the obstacle before being at least partially reflected thereby. A portion of the reflected wave beam returns to the apparatus as an echo wave beam. The apparatus detects the obstacle in response to the echo wave beam.

The known obstacle recognition apparatus is used in a warning system for a vehicle which alarms when an obstacle such as a preceding vehicle exists in a given detection area in front of the present vehicle. The known obstacle recognition apparatus is used also in a system for a vehicle which controls the speed of the vehicle to maintain a proper distance between the vehicle and a preceding vehicle.

The known obstacle recognition apparatus additionally has the function of determining whether or not the detected obstacle is a preceding vehicle. It is important to discriminate a preceding vehicle from other objects such as road-side objects or delineators.

Japanese patent application publication number 6-59038 discloses a laser radar for a vehicle which detects objects in a given detection area in front of the vehicle. The laser radar in Japanese application 6-59038 determines whether or not detected neighboring objects are road-side reflectors (delineators). Specifically, detected neighboring objects are recognized as delineators when the following conditions 1), 2), and 3) are satisfied. 1) The heights of detected neighboring objects from a horizontal reference line (for example, the road surface) are approximately equal to each other. 2) The horizontal intervals between detected neighboring objects are approximately equal to each other. 3) The differences between the distances to detected neighboring objects are approximately equal to each other. In addition, the laser radar in Japanese application 6-59038 determines whether or not two detected objects correspond to a vehicle (for example, a preceding vehicle or a stationary vehicle). This determination is based on the fact that the rear end face of a vehicle has a pair of reflex reflectors. Specifically, two detected objects are recognized as corresponding to a vehicle when the following conditions 4), 5), and 6) are satisfied. 4) The distances to two detected objects are approximately equal to each other. 5) The heights of two detected objects from the road surface are approximately equal to each other, and are in a predetermined range. 6) The horizontal distance between two detected objects is equal to or less than about 3 m.

In the case where the present vehicle is travelling along a road having a varying slope (for example, the present vehicle reaches the beginning or the end of a sloping road), the detected heights of delineators differ from each other so that the previously-indicated condition 1) is not satisfied. Therefore, in this case, the laser radar in Japanese application 6-59038 can not recognize delineators. Furthermore, the laser radar in Japanese application 6-59038 can not detect delineators on the road surface which are called cat's-eyes. As previously mentioned, the laser radar in Japanese application 6-59038 implements the determination as to a preceding vehicle on the basis of the fact that the rear end face of a vehicle has a pair of reflex reflectors. Accordingly, a two-wheeler or a motorcycle having a single reflector at its rear end can not be recognized as a preceding vehicle.

U.S. Pat. No. 6,018,308 (corresponding to Japanese patent application publication number 11-38142) discloses an obstacle recognition system for an automotive vehicle which is designed to distinguish preceding vehicles from other objects. The system in U.S. Pat. No. 6,018,308 includes a radar unit and a preceding vehicle determining circuit. The radar unit receives a signal produced by reflection of at least one of transmitted radar signals from an obstacle present in a given obstacle detectable zone, and determines a distance to the obstacle and a horizontal and a vertical angle of the obstacle from a preselected reference direction. The preceding vehicle determining circuit includes a two-dimensional shape data producing circuit that produces two-dimensional shape data of the obstacle on a two-dimensional plane in a width-wise and a vertical direction of the present vehicle based on the distance and the horizontal and vertical angles. The preceding vehicle determining circuit also includes a non-vehicle determining circuit that determines the obstacle as an object other than the vehicle when the two-dimensional shape data of the obstacle lies out of an ordinary vehicle shape range.

In the system of U.S. Pat. No. 6,018,308, the non-vehicle determination is responsive to a variation in the height of the obstacle which occurs for a prescribed time interval. The design enables the non-vehicle determination to be accurate even in the case where the present vehicle is traveling along a road having a varying slope.

U.S. Pat. No. 5,604,580 (corresponding to Japanese patent application publication number 7-225276) discloses a vehicular optical radar apparatus which can identify various types of obstacles as well as a preceding vehicle, thereby ensuring a reliable identification of the preceding vehicle running in the same lane as with a subject vehicle on which the apparatus is installed. In the apparatus of U.S. Pat. No. 5,604,580, light is emitted from a light emitting device. A scanner enables an area ahead of the subject vehicle to be scanned by the emitted light. A light receiving device receives the light caused by reflection of the emitted light at an object. A received-light intensity detection device detects an intensity of the reflected light received by the light receiving device. An obstacle identifying device identifies the object according to the distribution pattern of the received-light intensity detected by the intensity detection device, such as a pattern being obtained with respect to the scanning direction.

Japanese patent application publication number 10-142336 discloses an apparatus for recognizing a lane along which a vehicle is traveling. The apparatus in Japanese application 10-142336 calculates quantities $\Delta x$, $\Delta y$, and $\Delta \phi$ of movement of the vehicle which occur for every predetermined time interval on the basis of the speed V and the steering angle $\theta H$ of the vehicle. Here, $\Delta x$, $\Delta y$, and $\Delta \phi$ denote the quantity of movement in the lateral direction, the quantity of movement in the longitudinal direction, and the quantity of movement in the angular direction with respect to the vehicle, respectively. The apparatus in Japanese application 10-142336 includes a forward object recognizing section having a laser radar. The forward object recognizing section feeds a stationary-object determining section with information representing the positions of detected objects relative to the vehicle. The stationary-object determining section detects delineators on the road sides in response to the calculated vehicle movement quantities $\Delta x$, $\Delta y$, and $\Delta \phi$ and the information fed from the forward object recognizing section. The stationary-object determining section feeds a stationary-object-row recognizing section with information representing the detected delineators. The stationary-object-row recognizing section recognizes a row of delineators on the basis of the information fed from the stationary-object determining section. The stationary-object-row recognizing section feeds a lane estimating section with information representing the recognized delineator row. The lane estimating section estimates a lane along which the vehicle is traveling on the basis of the information fed from the stationary-object-row recognizing section. The estimated lane is used in determining a preceding vehicle. Specifically, a preceding vehicle to be detected is traveling along the lane same as the estimated lane.

SUMMARY OF THE INVENTION

It is a first object of this invention to provide a method of recognizing an obstacle to a vehicle which can discriminate a delineator group on the road surface and a nearby two-wheeler from each other at an early stage.

It is a second object of this invention to provide an apparatus for recognizing an obstacle to a vehicle which can discriminate a delineator group on the road surface and a nearby two-wheeler from each other at an early stage.

It is a third object of this invention to provide a recording medium which stores a computer program for recognizing an obstacle to a vehicle which can discriminate a delineator group on the road surface and a nearby two-wheeler from each other at an early stage.

A first aspect of this invention provides a method of recognizing an obstacle to a vehicle. The method comprises the steps of detecting height-wise positions of objects on the basis of distances to the objects from the vehicle, angles of the objects in a width-wise direction of the vehicle, and angles of the objects in a height-wise direction of the vehicle; determining a plurality of objects, which satisfy conditions predetermined depending on physical characteristics of delineators, to be objects composing a delineator group; when the detected height-wise position of an object in the delineator group which is nearest to the vehicle corresponds to a predetermined value or less, determining the delineator group to be a delineator group on a road surface; and determining whether or not each object in the on-road-surface delineator group is a non-delineator in response to conditions of the detected height-wise positions of the objects in the on-road-surface delineator group.

A second aspect of this invention provides an apparatus for recognizing an obstacle to a vehicle. The apparatus comprises radar means for applying a transmission wave to a predetermined angular range in a width-wise direction of the vehicle and a predetermined angular range in a height-wise direction of the vehicle, and detecting distances to objects, angles of the objects in the width-wise direction of the vehicle, and angles of the objects in the height-wise direction of the vehicle on the basis of reflected waves which result from reflections of the transmission wave; and recognizing means for recognizing obstacles ahead of the vehicle on the basis of the distances to the objects, the angles of the objects in the width-wise direction of the vehicle, and the angles of the objects in the height-wise direction of the vehicle which are detected by the radar means. The recognizing means comprises 1) object recognizing means for detecting height-wise positions of the objects on the basis of the distances to the objects, the angles of the objects in the width-wise direction of the vehicle, and the angles of the objects in the height-wise direction of the vehicle which are detected by the radar means; 2) delineator-group determining means for determining ones among the objects, which satisfy conditions predetermined depending on physical characteristics of delineators, to be objects composing a delineator group; 3) on-road-surface delineator-group determining means for, when the detected height-wise position of an object in the delineator group which is nearest to the vehicle corresponds to a predetermined value or less, determining the delineator group to be a delineator group on a road surface; and 4) non-delineator determining means for determining whether or not each object in the on-road-surface delineator group is a non-delineator in response to conditions of the detected heightwise positions of the objects in the on-road-surface delineator group.

A third aspect of this invention is based on the second aspect thereof, and provides an apparatus wherein the conditions predetermined depending on the physical characteristics of delineators are that intervals between the objects are smaller than a reference value.

A fourth aspect of this invention is based on the second aspect thereof, and provides an apparatus wherein the conditions of the detected height-wise positions of the objects comprise conditions of a variation in the detected height-wise positions of the objects.

A fifth aspect of this invention is based on the fourth aspect thereof, and provides an apparatus wherein the non-delineator determining means comprising means for determining whether or not each object in the on-road-surface delineator group is a non-delineator in response to a position of occurrence of a change among an increase, a decrease, and a constancy in a sequence of the detected height-wise positions of the objects.

A sixth aspect of this invention is based on the fifth aspect thereof, and provides an apparatus wherein the object determined to be the non-delineator is at a place immediately rearward of a position of occurrence of a change from an increase to a decrease in the sequence of the detected height-wise positions of the objects as viewed along a direction away from the vehicle.

A seventh aspect of this invention is based on the fifth aspect thereof, and provides an apparatus wherein the object determined to be the non-delineator is at a place immediately rearward of a position of occurrence of a change from a decrease to an increase in the sequence of the detected height-wise positions of the objects as viewed along a direction away from the vehicle.

An eighth aspect of this invention is based on the sixth aspect thereof, and provides an apparatus wherein the height-wise position of the object determined to be the non-delineator corresponds to a prescribed height or greater.

A ninth aspect of this invention is based on the eighth aspect thereof, and provides an apparatus wherein the prescribed height depends on a distance from the present vehicle.

A tenth aspect of this invention is based on the second aspect thereof, and provides an apparatus wherein the object recognizing means comprises means for recognizing shapes of the objects, and the delineator-group determining means comprises means for determining ones among the objects to be objects composing a delineator group in response to the recognized shapes of the objects.

An eleventh aspect of this invention is based on the second aspect thereof, and provides an apparatus wherein the object recognizing means comprises means for detecting speeds of the objects relative to the vehicle, means for detecting a speed of the vehicle, and means for determining whether the objects are moving or stationary in response to the detected relative speeds of the objects and the detected speed of the vehicle, and wherein the delineator-group determining means comprises means for determining ones among the stationary objects to be objects composing a delineator group.

A twelfth aspect of this invention is based on the second aspect thereof, and provides an apparatus wherein the detected height-wise positions of the objects comprise detected height-wise angles of the objects.

A thirteenth aspect of this invention provides a recording medium storing a program for controlling a computer operating as the object recognizing means, the delineator-group determining means, the on-road-surface delineator-group determining means, and the non-delineator determining means in the apparatus of the second aspect of this invention.

BRIEF DESCRIPTION OF THE DRAWINGS

FIG. 5 is a flowchart of a portion of a program for the computer in FIG. 1.

DETAILED DESCRIPTION OF THE INVENTION

Figure 1:
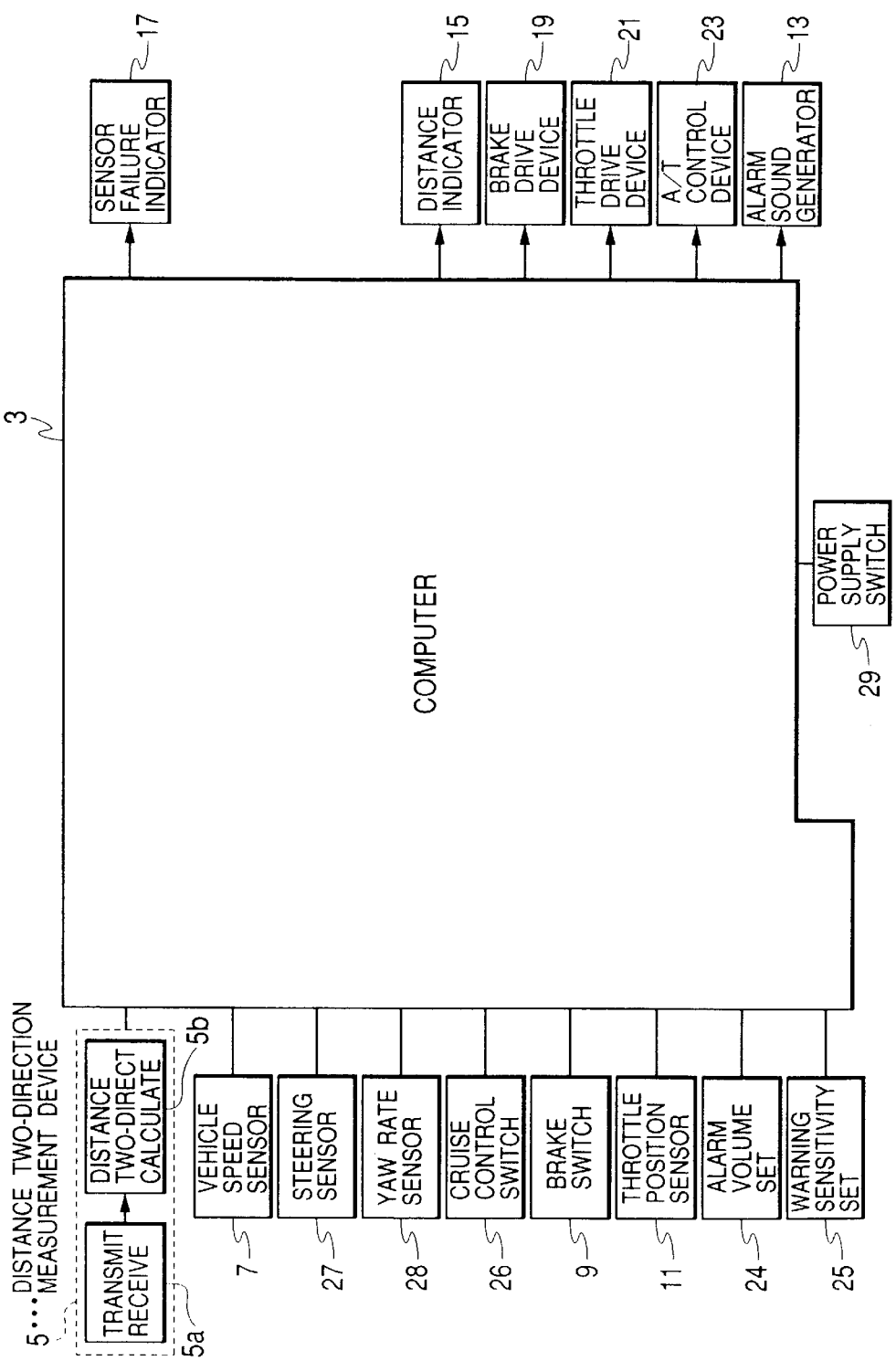
FIG. 1 is a block diagram of a vehicle control apparatus according to an embodiment of this invention.

FIG. 1 shows a vehicle control apparatus according to an embodiment of this invention. The vehicle control apparatus is mounted on a vehicle. The vehicle control apparatus alarms when an obstacle in a specified condition exists in a given detection area in front of the present vehicle. The vehicle control apparatus adjusts the speed of the present vehicle in accordance with the speed of a preceding vehicle.

As shown in FIG. 1, the vehicle control apparatus includes a computer (for example, a microcomputer) 3. The computer 3 has a combination of an input/output (I/O) interface, a CPU, a ROM, and a RAM. The computer 3 operates in accordance with a program stored in the ROM. The program may be stored in the RAM. In this case, the RAM is provided with a backup device.

Alternatively, the program may be stored in a recording medium such as a floppy disk, a magneto-optical disk, a CD-ROM, or a hard disk. In this case, the computer 3 is connected with a drive for the recording medium, and the program is downloaded into the computer 3 through the drive.

The vehicle control apparatus includes a distance and two-direction measurement device 5, a vehicle speed sensor 7, a brake switch 9, and a throttle opening degree sensor (a throttle position sensor) 11 which are connected to the computer 3. The output signals of the devices 5, 7, 9, and 11 are inputted into the computer 3.

The distance and two-direction measurement device 5 acts as an obstacle detection device for the present vehicle. The distance and two-direction measurement device 5 has a transmitting and receiving portion 5a, and a distance and two-direction calculating portion 5b. The transmitting and receiving portion 5a emits a forward laser beam ahead of the present vehicle, and controls the forward laser beam to periodically scan a given detection area in front of the present vehicle. The given detection area is monitored by the transmitting and receiving portion 5a. The given detection area has a predetermined angular dimension in the width-wise direction of the present vehicle and also a predetermined angular dimension in the height-wise direction of the present vehicle. In the case where an object exists in the given detection area, the forward laser beam encounters the object before being at least partially reflected thereby. A portion of the reflected laser beam returns to the transmitting and receiving portion 5a as an echo laser beam. The transmitting and receiving portion 5a receives the echo laser beam, and converts the echo laser beam into a corresponding electric signal. The transmitting and receiving portion 5a outputs the electric signal to the distance and two-direction calculating portion 5b. The distance and two-direction calculating portion 5b detects the angular direction of the object relative to the present vehicle in the coordinates of the two angular directions (the width-wise and height-wise angular directions) on the basis of the output signal of the transmitting and receiving portion 5a. The distance and two-direction calculating portion 5b measures the time interval between the moment of the transmission of a forward laser beam and the moment of the reception of a related echo laser beam in response to the output signal from the transmitting and receiving portion 5a. The distance and two-direction calculating portion 5b detects the distance "r" to the object from the present vehicle on the basis of the measured time interval. The distance and two-direction calculating portion 5b informs the computer 3 of the angular direction of the object and the distance "r" thereto. In general, since the object is smaller than the cross-sectional area of the forward laser beam and is scanned thereby, the distance and direction information notified from the distance and two-direction calculating portion 5b to the computer 3 relates to a partial object or a point-like part of an object. Objects detected by the distance and two-direction measurement device 5 include obstacles with respect to the present vehicle.

Figure 2:
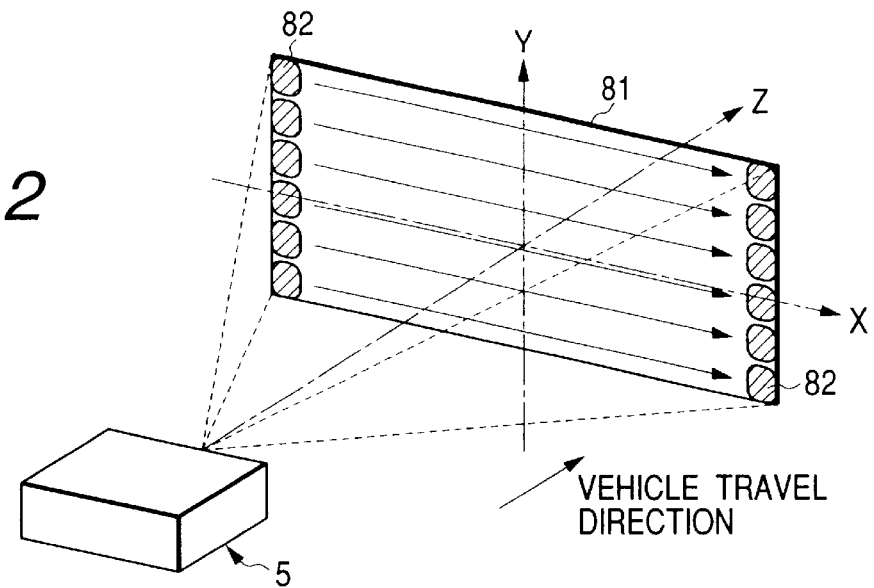
FIG. 2 is a perspective diagram of a distance and two-direction measurement device in the apparatus of FIG. 1, and a two-dimensional measurement area periodically scanned by a laser beam emitted from the distance and two-direction measurement device.

As shown in FIG. 2, a two-dimensional measurement area 81 corresponding to the given detection area is periodically scanned by the laser beam 82 emitted from the distance and two-direction measurement device 5. The scanning is of a line-by-line format. The laser beam 82 has an approximately circular cross-section. The cross section of the laser beam 82 may be elliptical or rectangular. The laser beam 82 may be replaced by a radio wave beam, a millimeter wave beam, or an ultrasonic beam. The scanning may be implemented by controlling the echo beam reception by the transmitting and receiving portion 5a.

With reference to FIG. 2, the central direction in the measurement area 81 is defined as the Z axis. The measurement area 81 corresponds to a given detection area in a two-dimensional X-Y plane perpendicular to the Z axis. The given detection area is scanned by the forward laser beam. The height-wise direction of the present vehicle is defined as corresponding to the Y axis. The Y axis is equal to a reference direction or a sub scanning direction. The width-wise direction of the present vehicle is defined as corresponding to the X axis. The X axis is equal to a main scanning direction. The given detection area has an angular dimension of 16 degrees (0.15 degree multiplied by 105 points or pixels) in the X-axis direction, and an angular dimension of 4 degrees (0.7 degree multiplied by 6 lines) in the Y direction. The X-axis scanning direction (the main scanning direction) starts from the left-hand edge of the measurement area 81 toward the right-hand edge thereof. The Y-axis scanning direction (the sub scanning direction) starts from the upper edge of the measurement area 81 toward the lower edge thereof. The measurement area 81 is covered by first, second, third, fourth, fifth, and sixth scanning lines extending parallel to the X axis. The first, second, third, fourth, fifth, and sixth scanning lines are sequentially arranged as viewed in the direction from the upper edge of the measurement area 81 to the lower edge thereof. During every period of the scanning, the uppermost linear zone in the measurement area 81 is scanned along the first scanning line. Subsequently, the second uppermost linear zone in the measurement area 81 is scanned along the second scanning line. Then, the following linear zones in the measurement area 81 are sequentially scanned along the third, fourth, fifth, and sixth scanning lines. Therefore, measurement-result data of 630 (105 points multiplied by 6 lines) points or pixels are available for every period of the scanning.

The fourth scanning line is defined as being horizontal. Thus, the direction of the forward laser beam in the fourth scanning line coincides with the horizontal axis. The direction of the forward laser beam in the first scanning line deviates upward from the horizontal axis by an angle of 3 multiplied by 0.7 degrees. The direction of the forward laser beam in the second scanning line deviates upward from the horizontal axis by an angle of 2 multiplied by 0.7 degrees. The direction of the forward laser beam in the third scanning line deviates upward from the horizontal axis by an angle of 0.7 degrees. The direction of the forward laser beam in the fifth scanning line deviates downward from the horizontal axis by an angle of 0.7 degrees. The direction of the forward laser beam in the sixth scanning line deviates downward from the horizontal axis by an angle of 2 multiplied by 0.7 degrees.

As previously mentioned, the information (the data) generated by the distance and two-direction calculating portion 5b represents the angular direction of a detected object and the distance "r" thereto. Specifically, the angular direction of the object is given by a set of the horizontal angle (the horizontal scan angle) $\theta x$ and the vertical angle (the vertical scan angle) $\theta y$. The angle between the forward laser beam related to the object and the X-Z plane is defined as the vertical angle (the vertical scan angle) $\theta y$. The angle between the Z axis and the line resulting from projecting the forward laser beam on the X-Z plane is defined as the horizontal angle (the horizontal scan angle) $\theta x$.

With reference back to FIG. 1, the vehicle control apparatus includes an alarm sound generator 13, a distance indicator 15, a sensor failure indicator 17, a brake drive device 19, a throttle drive device 21, and an automotive automatic transmission control device 23 which are connected to the computer 3, The computer 3 outputs drive signals to the devices 13, 15, 17, 19, 21, and 23.

The vehicle control apparatus includes an alarm sound volume setting device 24, an alarm sensitivity setting device 25, a cruise control switch 26, a steering sensor 27, and a yaw rate sensor 28 which are connected to the computer 3. The output signals of the devices 24, 25, 26, 27, and 28 are inputted into the computer 3. The alarm sound volume setting device 24 acts to set the volume of alarm sound. The alarm sensitivity setting device 25 acts to set the sensitivity in a warning determination process mentioned later. The steering sensor 27 detects the degree of operation of a vehicle steering wheel (not shown), that is, the steering angle in the present vehicle.

The vehicle control apparatus includes a power supply switch 29 connected to the computer 3. When the power supply switch 29 is changed to its on position, the computer 3 is powered and starts predetermined processes.

The computer 3 executes a warming determination process designed to generate an alarm in the case where an obstacle remains in a specified area during longer than a prescribed time interval. The obstacle corresponds to, for example, a preceding vehicle, a stationary vehicle, a guard-rail on a road side, or a prop on a road side. Simultaneously with the execution of the warning determination process, the computer 3 operates to control the distance between the present vehicle and a preceding vehicle. Specifically, during the inter-vehicle distance control (the vehicle-to-vehicle distance control), the computer 3 controls the brake drive device 19, the throttle drive device 21, and the automatic transmission control device 23 and thereby adjusts the speed of the present vehicle in accordance with conditions of the preceding vehicle.

Figure 3:
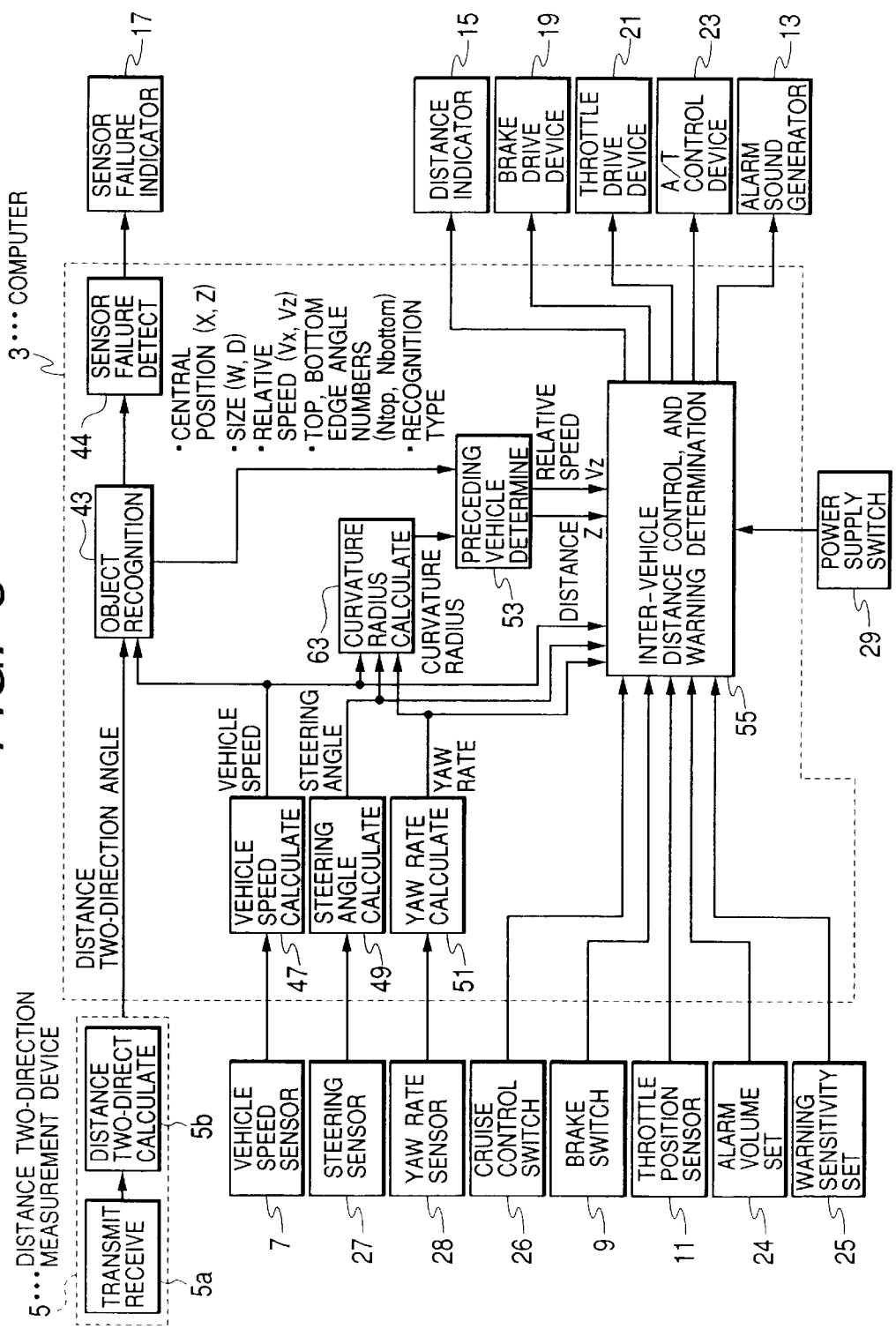
FIG. 3 is an operation flow diagram of a computer in FIG. 1.

FIG. 3 shows the flow of operation of the computer 3 rather than the hardware structure thereof. With reference to FIG. 3, an object recognition block 43 receives, from the distance and angle calculating portion 5b in the distance and two-direction measurement device 5, measurement data representing a distance "r", a horizontal scan angle θx, and a vertical scan angle θy concerning each detected object (each detected partial object or each detected point-like object part). The object recognition block 43 converts the polar-coordinate data of the distance "r" and the horizontal scan angle θx into measurement data of X-Z orthogonal coordinates designed so that the origin (O, O) coincides with the center of a laser radar formed by the distance and angle measurement device 5, and the X axis and the Z axis coincide with the width-wise direction and the longitudinal forward direction of the present vehicle respectively. The object recognition block 43 calculates the central position (X, Z) and size (W, D) of each detected object on the basis of the orthogonal-coordinate measurement data. Here, W denotes a transverse width, and D denotes a depth. The object recognition block 43 calculates the speed (Vx, Vz) of the object relative to the present vehicle from time-domain change in the central position (X, Z) thereof.

Figure 4:
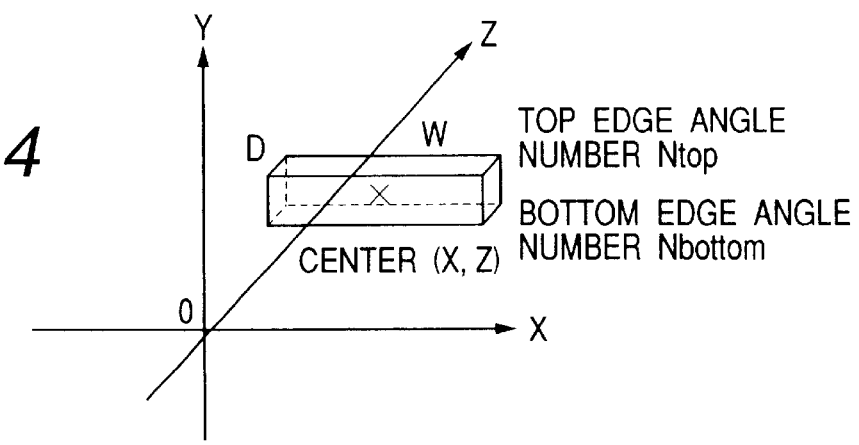
FIG. 4 is a diagram of a detected object, and top and bottom edge angle numbers Ntop and Nbottom for the detected object.

With reference to FIGS. 3 and 4, the object recognition block 43 recognizes the top and bottom edges of each detected object by referring to the data of the vertical scan angle θy concerning the detected object. For each detected object, the object recognition block 43 uses the θy data as an indication of (Ntop, Nbottom) where Ntop denotes a number representative of the vertical scan angle of the top edge of the detected object and Nbottom denotes a number representative of the vertical scan angle of the bottom edge of the detected object. Each of the top and bottom edge angle numbers Ntop and Nbottom assumes one among values of "1", "2", "3", "4", "5", and "6" which correspond to the first, second, third, fourth, fifth, and sixth scanning lines (see FIG. 2), respectively. As previously mentioned, the fourth scanning line is defined as being horizontal. Thus, an Ntop value of "1", "2", or "3" indicates that the top edge of the related target is above the horizontal axis. On the other hand, an Ntop value of "5" or "6" indicates that the top edge of the related target is below the horizontal axis.

A vehicle speed calculation block 47 computes the speed V of the present vehicle on the basis of the output signal from the vehicle speed sensor 7. The object recognition block 43 is informed of the speed V of the present vehicle by the vehicle speed calculation block 47. The object recognition block 43 determines whether or not each detected object is stationary or moving on the basis of the vehicle speed V and the relative speed (Vx, Vz). One or more which may affect the travel of the present vehicle are selected from among detected objects on the basis of the stationary-moving determination results and the central positions of the detected objects. Information of the distance to each selected object is transferred to the distance indicator 15 so that the distance to the selected object is indicated by the distance indicator 15. A model of an object which is represented by central position data, size data, relative-speed data, stationary-moving determination result data (recognition type data), and top and bottom edge angle data will be called a target model.

A sensor failure detection block 44 receives the output data (the object-recognition result data) from the object recognition block 43 which represent the object parameters calculated thereby. The sensor failure detection block 44 determines whether the output data from the object recognition block 43 are in a normal range or an abnormal range. When the output data from the object recognition block 43 are in the abnormal range, the sensor failure detection block 44 activates the sensor failure indicator 17 to indicate a failure.

A steering angle calculation block 49 computes the steering angle regarding the present vehicle on the basis of the output signal from the steering sensor 27. A yaw rate calculation block 51 computes the yaw rate of the present vehicle on the basis of the output signal from the yaw rate sensor 28.

A curvature-radius calculation block 63 is informed of the vehicle speed V by the vehicle speed calculation block 47. The curvature-radius calculation block 63 is informed of the computed steering angle by the steering angle calculation block 49. The curvature-radius calculation block 63 is informed of the computed yaw rate by the yaw rate calculation block 51. The curvature-radius calculation block 63 computes the radius R of curvature of the road on the basis of the vehicle speed V, the steering angle, and the yaw rate.

A preceding-vehicle determination block 53 is informed of the computed curvature radius R by the curvature-radius calculation block 63. The preceding-vehicle determination block 53 is informed of the stationary-moving determination results, the object central positions (X, Z), the object sizes (W, D), the relative speeds (Vx, Vz), and the top and bottom edge angle numbers (Ntop, Nbottom) by the object recognition block 43. The preceding vehicle determination block 53 determines or selects a preceding-vehicle from among the detected objects on the basis of the curvature radius R, the stationary-moving determination results, the object central positions (X, Z), the object sizes (W, D), the relative speeds (Vx, Vz), and the top and bottom edge angle numbers (Ntop, Nbottom). The preceding-vehicle determination block 53 calculates the distance Z to the preceding vehicle from the present vehicle, and the speed Vz of the preceding vehicle relative to the present vehicle.

An inter-vehicle distance control and warning determination block 55 is informed of the distance Z to the preceding vehicle and the relative speed Vz by the preceding-vehicle determination block 53. The inter-vehicle distance control and warning determination block 55 is informed of the vehicle speed V by the vehicle speed calculation block 47. The inter-vehicle distance control and warning determination block 55 computes the acceleration of the preceding vehicle from the relative speed Vz and the vehicle speed V. The inter-vehicle distance control and warning determination block 55 is informed of the object central positions (X, Z), the object widths D, and the stationary-moving determination results by the object recognition block 43. The inter-vehicle distance control and warning determination block 55 detects setting conditions of the cruise control switch 26 from the output signal thereof. The inter-vehicle distance control and warning determination block 55 detects the state of the brake switch 9 from the output signal thereof. The state of the brake switch 9 represents whether or not a vehicle brake pedal is depressed. The inter-vehicle distance control and warning determination block 55 is informed of the degree of opening through a vehicular engine throttle valve by the throttle opening degree sensor 11. The inter-vehicle distance control and warning determination block 55 is informed of the alarm sensitivity setting value by the alarm sensitivity setting device 25. The inter-vehicle distance control and warning determination block 55 implements a warning determination and a cruise determination in response to the distance Z to the preceding vehicle, the relative speed Vz, the vehicle speed V, the preceding vehicle acceleration, the object central positions (X, Z), the object widths D, the stationary-moving determination results, the setting conditions of the cruise control switch 26, the state of the brake switch 9, the throttle opening degree, and the alarm sensitivity setting value. During the warning determination, the inter-vehicle distance control and warning determination block 55 determines whether or not an alarm should be generated. During the cruise determination, the inter-vehicle distance control and warning determination block 55 determines the contents of vehicle speed control. When it is determined that an alarm should be generated, the inter-vehicle distance control and warning determination block 55 outputs an alarm generation signal to the alarm sound generator 13, In this case, the alarm sound generator 13 produces alarm sound. The inter-vehicle distance control and warning determination block 55 adjusts the level of the alarm sound in accordance with the sound volume set by the alarm sound volume setting device 24. In the case where the cruise determination corresponds to the execution of cruise control, the inter-vehicle distance control and warning determination block 55 outputs suitable control signals to the automotive automatic transmission control device 23, the brake drive device 19, and the throttle drive device 21. During the execution of warning control and cruise control, the inter-vehicle distance control and warning determination block 55 outputs an indication signal to the distance indicator 15 to inform the vehicle's driver of distance-related conditions.

As previously mentioned, the computer 3 operates in accordance with a program stored in its internal ROM or RAM. FIG. 5 is a flowchart of a portion of the program for the computer 3 which relates to the recognition of an obstacle to the present vehicle. The program portion in FIG. 5 is repetitively executed at a period corresponding to the period of the scanning implemented by the distance and two-direction measurement device 5.

As shown in FIG. 5, a first step S1000 of the program portion receives distance and two-direction angle measurement data from the distance and two-direction measurement device 5 for one period of the scanning. In other words, the step S1000 receives distance and two-direction angle measurement data corresponding to one frame. The scanning period is equal to, for example, 100 msec.

A step S2000 following the step S1000 corresponds to the object recognition block 43. The step S2000 implements the previously-mentioned object recognition on the basis of the distance and two-direction angle measurement data. Each object recognized or detected by the step S2000 will be called a target or a target model.

A step S3000 subsequent to the step S2000 groups the targets detected by the step S2000 to recognizes a delineator group. The targets detected by the step S2000 correspond to delineators, signboards, vehicles, two-wheelers, and other objects. The step S3000 excludes non-delineator targets (for example, targets corresponding to signboards and vehicles), and selects targets corresponding to delineators. To this end, the step S3000 searches the targets detected by the step S2000 for ones which satisfy both the following conditions ① and ②.
① The transverse width W of a target is smaller than 1.0 m.
② The absolute value of the X-axis-direction distance ΔX between the centers of targets is smaller than 1 m, and the absolute value of the Z-axis-direction distance ΔZ therebetween is smaller than 20 m. In other words, |ΔX|<1 m and |ΔZ|<20 m.

Figure 6:
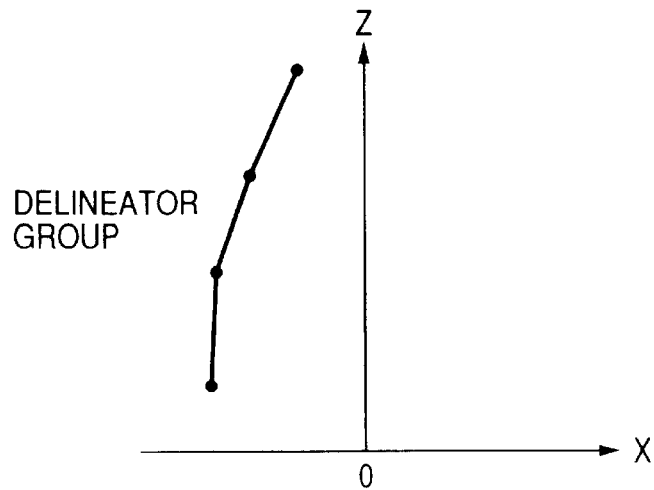
FIG. 6 is a diagram of a detected delineator group.

The step S3000 places the targets which satisfy both the above-indicated conditions ② and ② in a common candidate group. There can be a plurality of candidate groups. The step S3000 uses one or more of candidate groups as a delineator group or groups. Each selected candidate group, that is, each delineator group, is required to have three or more targets. FIG. 6 shows an example of a delineator group recognized or detected by the step S3000.

With reference back to FIG. 5, a step S4000 following the step S3000 determines whether or not each delineator group detected by the step S3000 corresponds to a group of delineators (cat's-eyes) on the road surface. Specifically, the step S4000 selects one from among targets in the delineator group which is the nearest to the present vehicle (that is, which is the smallest in distance value Z). The step S4000 compares the top edge angle number Ntop of the nearest target with a value of "5". When the top edge angle number Ntop is equal to or greater than a value of "5", the step S4000 determines that the delineator group corresponds to an on-road-surface delineator group. In this case, the program advances from the step S4000 to a step S5000. When the top edge angle number Ntop is smaller than a value of "5", the step S4000 determines that the delineator group does not correspond to an on-road-surface delineator group. In this case, the program exits from the step S4000, and then the current execution cycle of the program portion ends.

When the present vehicle is travelling on the beginning or the end of a sloping road, the detected heights of far targets in the delineator group tend to be greatly offset from their actual heights. On the other hand, the detected height of the nearest target in the delineator group is less offset from its actual height. Accordingly, the use of the nearest target by the step S4000 enhances the accuracy of the determination as to whether or not the delineator group corresponds to an on-road-surface delineator group.

There is a chance that the on-road-surface delineator group determined by the step S4000 contains a non-delineator target, for example, a target corresponding to a two-wheeler near on-road-surface delineators. The step S5000 detects such a non-delineator target.

Specifically, the step S5000 searches the targets in the on-road-surface delineator group for one which satisfies both the following conditions (a) and (b).
(a) In the case where the distance Z to a subject target is smaller than 40 m, the top edge angle number Ntop of the target is equal to "1", "2", or "3". In the case where the distance Z to a subject target is equal to or greater than 40 m, the top edge angle number Ntop of the target is equal to "1", "2", "3", or "4".
(b) In the case where the targets of the on-road-surface delineator group are sequentially arranged in the order of distance Z from the smallest to the greatest, a subject target is at a place immediately rearward of a point of the occurrence of a change from a monotonically decrease or a constancy to an increase in top edge angle number Ntop.

The step S5000 determines that the target which satisfies both the conditions (a) and (b) corresponds to a non-delineator. The non-delineator target detected by the step S5000 can be used as candidates for a preceding vehicle to be determined. After the step S5000, the current execution cycle of the program portion ends.

Figure 7:
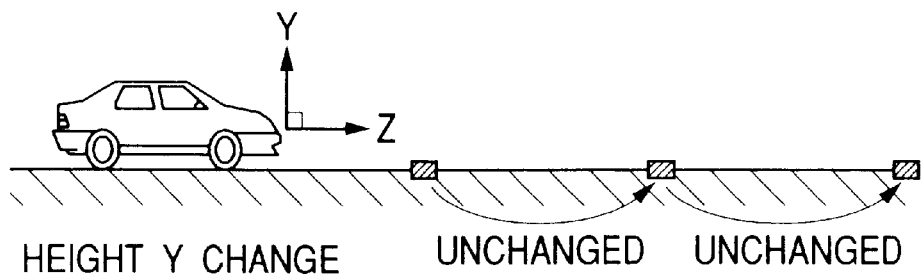
FIG. 7 is a diagram of conditions where the present vehicle is traveling along a flat road, and there are delineators on the surface of the road.
Figure 8:
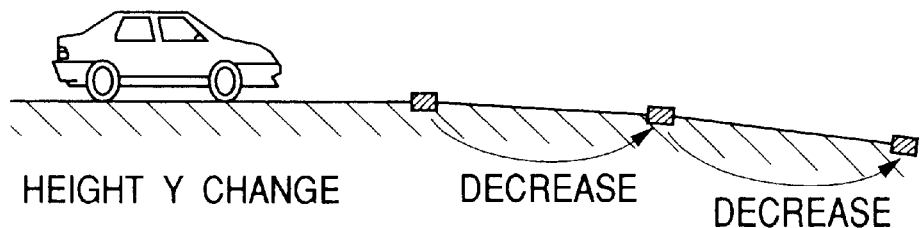
FIG. 8 is a diagram of conditions where the present vehicle is traveling along a flat road portion preceded by a downward slope, and there are delineators on the surface of the road.
Figure 9:
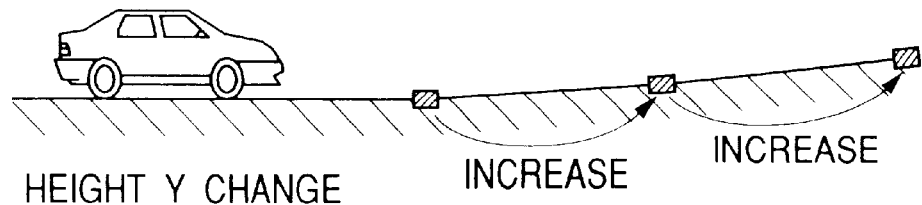
FIG. 9 is a diagram of conditions where the present vehicle is traveling along a flat road portion preceded by an upward slope, and there are delineators on the surface of the road.

FIG. 7 shows the case where the present vehicle is traveling along a flat road, and there are delineators on the surface of the road. In this case, the heights of the delineators relative to the present vehicle are equal to each other. FIG. 8 shows the case where the present vehicle is traveling along a flat road portion preceded by a downward slope, and there are delineators on the surface of the road. In this case, the height of a delineator relative to the present vehicle monotonically decreases as the delineator is farther from the present vehicle. FIG. 9 shows the case where the present vehicle is traveling along a flat road portion preceded by an upward slope, and there are delineators on the surface of the road. In this case, the height of a delineator relative to the present vehicle monotonically increases as the delineator is farther from the present vehicle.

Figure 10:
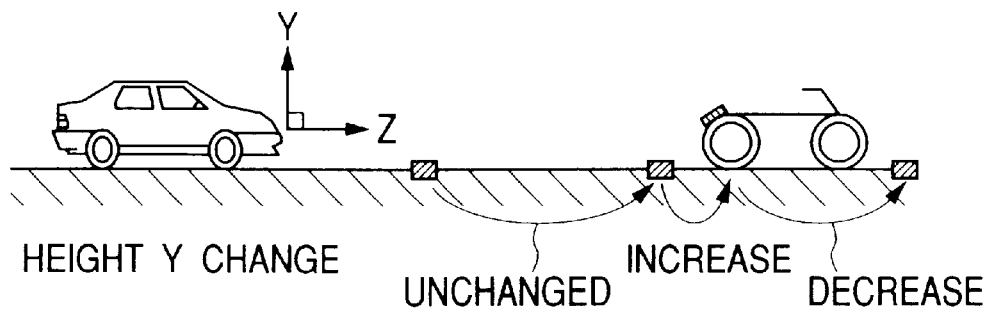
FIG. 10 is a diagram of conditions where the present vehicle is traveling along a flat road, and there are delineators on the surface of the road while a two-wheeler exists near two of the delineators.
Figure 11:
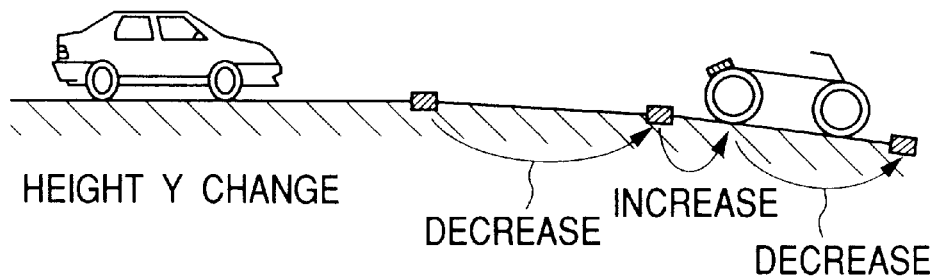
FIG. 11 is a diagram of conditions where the present vehicle is traveling along a flat road portion preceded by a downward slope, and there are delineators on the surface of the road while a two-wheeler exists near two of the delineators.
Figure 12:
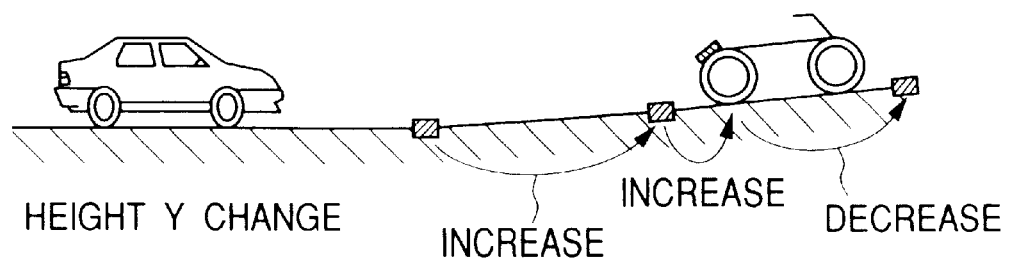
FIG. 12 is a diagram of conditions where the present vehicle is traveling along a flat road portion preceded by an upward slope, and there are delineators on the surface of the road while a two-wheeler exists near two of the delineators.

FIG. 10 shows the case where the present vehicle is traveling along a flat road, and is preceded by a two-wheeler. There are delineators on the surface of the road. The two-wheeler is located near two of the delineators. The delineators and the two-wheeler are now defined as targets. In the case of FIG. 10, the height of a target relative to the present vehicle remains constant for a certain range and then increases and decreases as the target is farther from the present vehicle. FIG. 11 shows the case where the present vehicle is traveling along a flat road portion preceded by a downward slope, and a two-wheeler is moving along the downward slope. There are delineators on the surface of the road. The two-wheeler is located near two of the delineators. The delineators and the two-wheeler are now defined as targets. In the case of FIG. 11, the height of a target relative to the present vehicle remains constant for a certain range and then increases and decreases as the target is farther from the present vehicle. FIG. 12 shows the case where the present vehicle is traveling along a flat road portion preceded by an upward slope, and a two-wheeler is moving along the downward slope. There are delineators on the surface of the road. The two-wheeler is located near two of the delineators. The delineators and the two-wheeler are now defined as targets. In the case of FIG. 12, the height of a target relative to the present vehicle increases and then decreases as the target is farther from the present vehicle.

In view of the target height changes mentioned with reference to FIGS. 10, 11, and 12, the step S5000 of FIG. 5 discriminates a non-delineator target (for example, a two-wheeler target) from on-road-surface delineator targets. The discrimination between a non-delineator target and on-road-surface delineator targets will be described below in more detail.

Figure 13:
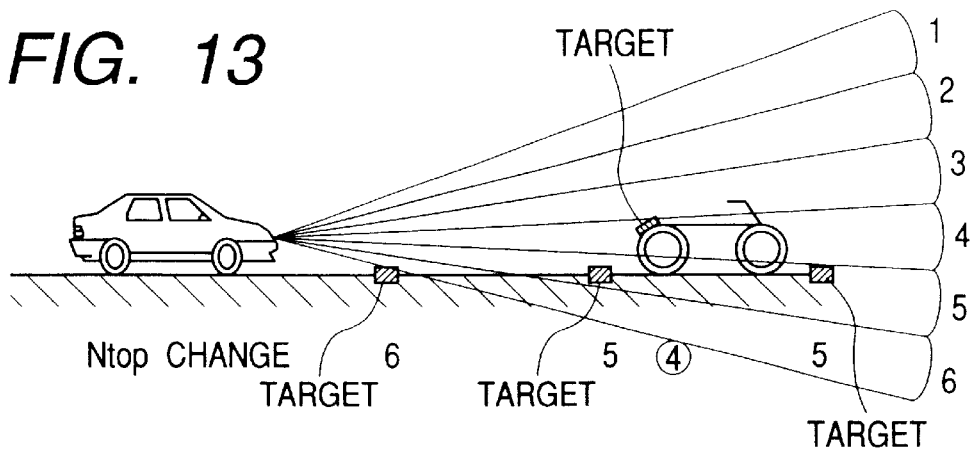
FIG. 13 is a diagram of conditions where the present vehicle is traveling along a flat road, and there are delineators on the surface of the road while a two-wheeler exists near two of the delineators.
Figure 14:
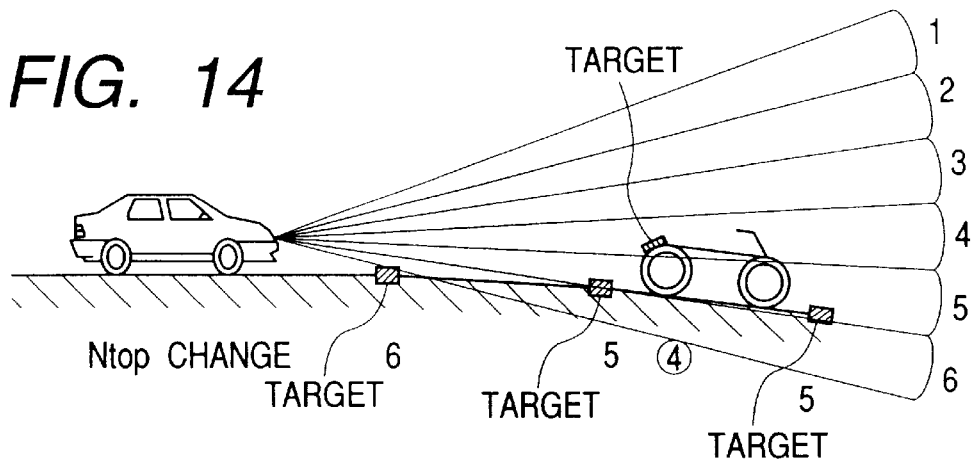
FIG. 14 is a diagram of conditions where the present vehicle is traveling along a flat road portion preceded by a downward slope, and there are delineators on the surface of the road while a two-wheeler exists near two of the delineators.
Figure 15:
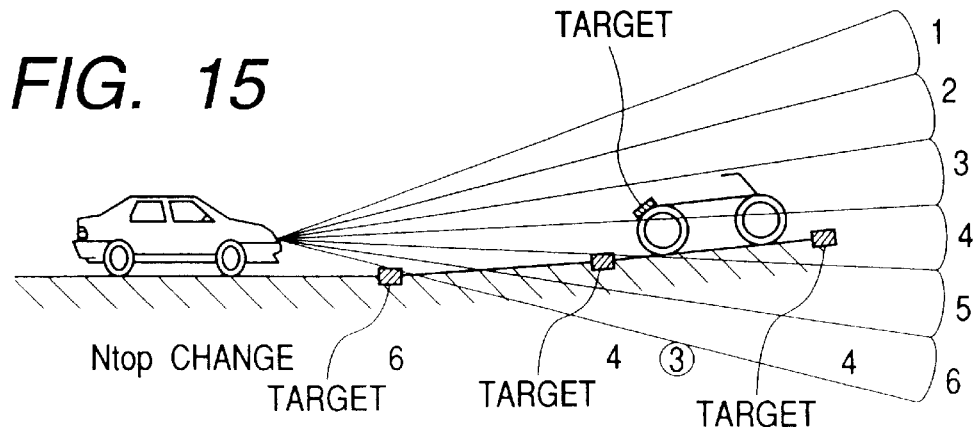
FIG. 15 is a diagram of conditions where the present vehicle is traveling along a flat road portion preceded by an upward slope, and there are delineators on the surface of the road while a two-wheeler exists near two of the delineators.

FIG. 13 shows the case where the present vehicle is traveling along a flat road, and is preceded by a two-wheeler. FIG. 14 shows the case where the present vehicle is traveling along a flat road portion preceded by a downward slope, and a two-wheeler is moving along the downward slope. In this case, the height of a target as viewed from the present vehicle decreases in accordance with an increase in the distance to the target. In view of the case of FIG. 14, the previously-mentioned conditions (a) are designed to depend on whether or not the distance Z to a subject target is smaller than 40 m. FIG. 15 shows the case where the present vehicle is traveling along a flat road portion preceded by an upward slope, and a two-wheeler is moving along the upward slope. In this case, the height of a target as viewed from the present vehicle increases in accordance with an increase in the distance to the target. The previously-mentioned conditions (b) are introduced to prevent an actual on-road-surface delineator from being recognized as a non-delineator in the case of FIG. 15.

A further description will be given below with reference to FIGS. 13, 14, and 15. In FIG. 13, there are delineators on the surface of the flat road, and the two-wheeler is located near two of the on-road-surface delineators. The top edge angle number Ntop of the two-wheeler target is equal to "4", while the top edge angle number Ntop of the on-road-surface delineator target immediately rearward of the two-wheeler target is equal to "5". The top edge angle number Ntop of the on-road-surface delineator target immediately ahead of the two-wheeler target is equal to "5". The top edge angle number Ntop of the nearest on-road-surface delineator is equal to "6". These targets compose an on-road-surface delineator group detected or recognized by the step S4000 (see FIG. 5). According to the previously-mentioned conditions (b), the targets are sequentially arranged in the order of distance Z from the smallest to the greatest. In this case, the top edge angle number Ntop changes as 6→5→4→5. The two-wheeler target is at a place immediately rearward of a point of the occurrence of a change from a monotonically decrease to an increase in top edge angle number Ntop. Accordingly, the two-wheeler target satisfies the previously-mentioned conditions (b). Thus, the two-wheeler target is recognized by the step S5000 (see FIG. 5) as a non-delineator.

In FIG. 14, there are delineators on the surface of the road, and the two-wheeler is located near two of the on-road-surface delineators. The top edge angle number Ntop of the two-wheeler target is equal to "4", while the top edge angle number Ntop of the on-road-surface delineator target immediately ahead of the two-wheeler target is equal to "5". The top edge angle number Ntop of the on-road-surface delineator target immediately rearward of the two-wheeler target is equal to "5". The top edge angle number Ntop of the nearest on-road-surface delineator is equal to "6". These targets compose an on-road-surface delineator group detected or recognized by the step S4000 (see FIG. 5). According to the previously-mentioned conditions (b), the targets are sequentially arranged in the order of distance Z from the smallest to the greatest. In this case, the top edge angle number Ntop changes as 6→5→4→5. The two-wheeler target is at a place immediately rearward of a point of the occurrence of a change from a monotonically decrease to an increase in top edge angle number Ntop. Accordingly, the two-wheeler target satisfies the previously-mentioned conditions (b). Thus, the two-wheeler target is recognized by the step S5000 (see FIG. 5) as a non-delineator.

In FIG. 15, there are delineators on the surface of the road, and the two-wheeler is located near two of the on-road-surface delineators. The top edge angle number Ntop of the two-wheeler target is equal to "3", while the top edge angle number Ntop of the on-road-surface delineator target immediately rearward of the two-wheeler target is equal to "4". The top edge angle number Ntop of the on-road-surface delineator target immediately ahead of the two-wheeler target is equal to "4". The top edge angle number Ntop of the nearest on-road-surface delineator is equal to "6". These targets compose an on-road-surface delineator group detected or recognized by the step S4000 (see FIG. 5). According to the previously-mentioned conditions (b), the targets are sequentially arranged in the order of distance Z from the smallest to the greatest. In this case, the top edge angle number Ntop changes as 6→4→3→4. The two-wheeler target is at a place immediately rearward of a point of the occurrence of a change from a monotonically decrease to an increase in top edge angle number Ntop. Accordingly, the two-wheeler target satisfies the previously-mentioned conditions (b). Thus, the two-wheeler target is recognized by the step S5000 (see FIG. 5) as a non-delineator.

In the embodiment of this invention, the distance and two-direction measurement device 5 corresponds to radar means while the object recognition block 43 and the preceding-vehicle determination block 53 provided by the computer 3 correspond to recognizing means. Specifically, the object recognizing block 43 corresponds to object recognizing means. The preceding-vehicle determination block 53 corresponds to delineator-group determining means, on-road-surface delineator-group determining means, and non-delineator determining means.

The embodiment of this invention has advantages as follows. Object recognition (obstacle recognition) includes a determination concerning a delineator group on the surface of a road which is designed to use object-height information.

Accordingly, it is possible to discriminate an on-road-surface delineator group from vehicles except two-wheelers (the steps S3000 and S4000 in FIG. 5). Furthermore, it is possible to discriminate a non-delineator or a two-wheeler from an on-road-surface delineator group (the step S5000 in FIG. 5). Thus, an on-road-surface delineator group and a nearby two-wheeler can be recognized while being discriminated from each other. This recognition is based on instantaneously-available information of the heights of targets in the on-road-surface delineator group rather than information of a time-domain change of a condition of one target. Thus, the result of the recognition can be provided at an early stage.

As previously mentioned, a non-delineator is discriminated from an on-road-surface delineator group. Therefore, a non-delineator corresponding to a two-wheeler can be added to candidate targets for a preceding vehicle to be detected. Accordingly, a preceding vehicle can be more suitably selected from among candidate targets. In addition, the inter-vehicle distance control and the warning determination can be more properly executed.

The embodiment of this invention may be modified as follows. The total number of scanning lines may differ from six. In the case, each of the top and bottom edge angle numbers Ntop and Nbottom assumes one among different values, the number of which is equal to the total number of scanning lines.

In the embodiment of this invention, the distance and two-direction measurement device 5 which employs the laser beam is used as radar means. The distance and two-direction measurement device 5 may be modified to use a millimeter wave beam. In the case where the radar means uses a Doppler radar or an FMCW radar employing a millimeter wave beam, information of a distance to a preceding vehicle and information of a relative speed of the preceding vehicle are simultaneously derived from an echo wave beam (a return wave beam). Thus, in this case, it is unnecessary to execute a step of calculating a relative speed from distance information.

What is claimed is:

1. A vehicle radar obstacle recognition method, comprising:

detecting respective locations of objects within a defined object detection area on the basis of respective distances to the objects from the vehicle, respective first angles formed between respective detected locations of the objects in a primary scanning direction within the defined detection area and a reference axis formed in a secondary scanning direction within the defined detection area, and respective second angles formed between respective detected locations of the objects in the secondary scanning direction and a reference axis in the primary scanning direction;

determining a plurality of objects, which satisfy conditions predetermined depending on physical characteristics of delineators, to be objects composing a delineator group;

when the detected location of an object in the delineator group which is nearest to the vehicle is equal to or less than a predetermined value, determining the delineator group to be a delineator group on a road surface; and determining whether or not each object in the on-road-surface delineator group is a non-delineator in response to conditions of the respective detected locations of the objects in the on-road-surface delineator group.

2. A vehicle obstacle recognition apparatus, comprising:

radar means for applying a transmission wave to a predetermined angular range in a primary scanning direction and a predetermined angular range in a sub scanning direction, and for detecting distances to objects, first angles of the objects formed between each respective object location in the primary scanning direction and a reference axis in the sub scanning direction, and second angles of the objects formed between each respective object location in the sub scanning direction and a reference axis in the primary scanning direction on the basis of reflected waves which result from reflections of the transmission wave; and recognizing means for recognizing obstacles ahead of the vehicle on the basis of the distances to the objects, the first angles, and the second angles;

wherein the recognizing means comprises:

1) object recognizing means for detecting respective locations of the objects on the basis of the distances to the objects, the first angles of the objects, and the second angles of the objects;

2) delineator-group determining means for determining ones among the objects which satisfy conditions predetermined depending on physical characteristics of delineators, to be objects composing a delineator group;

3) on-road-surface delineator-group determining means for, when the detected location of an object in the delineator group which is nearest to the vehicle is less than or equal to a predetermined value, determining the delineator group to be a delineator group on a road surface; and 4) non-delineator determining means for determining whether or not each object in the on-road-surface delineator group is a non-delineator in response to conditions of the detected locations of the objects in the on-road-surface delineator group.

3. An apparatus as recited in claim 2, wherein the conditions predetermined depending on the physical characteristics of delineators are that intervals between the objects are smaller than a reference value.

4. An apparatus as recited in claim 2, wherein the conditions of the detected locations of the objects comprise conditions of a variation in the detected locations of the objects.

5. An apparatus as recited in claim 4, wherein the non-delineator determining means comprises means for determining whether or not each object in the on-road-surface delineator group is a non-delineator in response to a position of occurrence of a change among an increase, a decrease, and a constancy in a sequence of the detected locations of the objects.

6. An apparatus as recited in claim 5, wherein the object determined to be the non-delineator is at a place immediately rearward of a position of occurrence of a change from an increase to a decrease in the sequence of the detected locations of the objects as viewed along a direction away from the vehicle.

7. An apparatus as recited in claim 6 wherein the position of the object determined to be the non-delineator is greater than or equal to a predetermined distance above a horizontal reference plane.

8. An apparatus as recited in claim 7, wherein the prescribed height depends on a distance from the present vehicle.

9. An apparatus as recited in claim 5, wherein the object determined to be the non-delineator is at a place immediately rearward of a position of occurrence of a change from a decrease to an increase in the sequence of the detected locations of the objects as viewed along a direction away from the vehicle.

10. An apparatus as recited in claim 2, wherein the object recognizing means comprises means for recognizing shapes of the objects, and the delineator-group determining means comprises means for determining ones among the objects to be objects composing a delineator group in response to the recognized shapes of the objects.

11. An apparatus as recited in claim 2, wherein the object recognizing means comprises means for detecting speeds of the objects relative to the vehicle, means for detecting a speed of the vehicle, and means for determining whether the objects are moving or stationary in response to the detected relative speeds of the objects and the detected speed of the vehicle, and wherein the delineator-group determining means comprises means for determining ones among the stationary objects to be objects composing a delineator group.

12. An apparatus as recited in claim 2, wherein the detected locations of the objects are determined based on the respective second angles.

* * * * *